United States Patent Office 3,426,701
Patented Feb. 11, 1969

1

3,426,701
TOWLINE CART SWITCHING DEVICE
Edwin C. Braun, Jr., Smithsburg, Md., assignor to Aerojet-General Corporation, Azusa, Calif., a corporation of Ohio
Filed Dec. 22, 1964, Ser. No. 420,322
U.S. Cl. 104—172       19 Claims
Int. Cl. B61b 9/00; B61j 3/04

ABSTRACT OF THE DISCLOSURE

This invention relates to towline systems in which carts are pulled along a floor by means of towpins carried by the carts and guided in slots in the floor wherein the towpins engage towlines disposed below the slots.

The present invention provides switching of carts from one towline loop or track to another, the tracks having a common side upstream of the switching mechanism, and the cars being alternated between downstream tracks at a switch junction. Thus, a common side is effected by running a track of one loop below the track of another so that all carts from two loops merge to be moved along the common side leading to the junction. This common side arrangement enables cart movement to be readily achieved to and from transverse storage or loading spurs joining the common side, such carts coming originally from either loop.

---

The present application is a companion to a co-pending application of the same inventor and assigned to the same assignee, S.N. 495,112, filed Oct. 12, 1965. In the companion case, there is disclosed a cart stopping device and system wherein one or a plurality of successive carts may be stopped by the mechanism shown therein.

In such a system use is also made of the cart stopping device of the co-pending application.

It is, accordingly, an object of the invention to provide a switch junction having a switching device which can be met to shunt all carts moving thereto continuously into one or the other of the common sided loops or automatically alternate between the two loops. Thus the carts alternately divide at the switch junction, a first cart going into one loop, a second cart going into the other loop, the third cart going into the one loop, etc.

Among other objects of the invention are to provide a switch mechanism which is exceedingly simple in construction, readily manufactured, can with ease be set to effect the selectivity of cart shunting described above, and having versatility for use in various conveying and sorting systems.

Briefly, the invention comprises a plurality of loops having a common side wherein the towline chains and respective guide tracks therefor, otherwise conventional, are uniquely disposed by being in a vertical plane at such common side, only the upper chain being effective for towing carts at that time. At the downstream end of the common side a switching junction is provided having an entrance guide slot which connects with the floor guide slot of the upper chain, and also having a pair of diverging downstream exit guide slots which connect with the chain powered slot portions of respective towline loops. The arrangement is such that the chains of both loops pass below the floor at the entrance to a switching mechanism provided at the junction, there being no power tow for carts in moving into the junction, the carts at the junction being pushed by carts still under tow power immediately upstream of the junction. Thus the chains of the two loops merely run below floor plates at the junction and are inaccessible for the area of the switching junction, becoming accessible through the floor guide slots immediately downstream of such junction where such slots connect with the switch junction exit slots.

Accordingly, a single towline chain effects movement of carts to the switching junction, at which point connection between the towpins of the carts and such chain is disengaged. Hence the carts move through the junction via non-powered guide slots, being shunted into either exit slot and then to powered guide slots of the respective loops. A switch plate is provided at the junction which can pivot into a position so as to open one exit slot and close the other.

A particular feature of the invention resides in the provision of a selector plate carried by the switch plate and adjustably securable thereon. The switch plate is of triangular shape, having an apex which can move back and forth across the entrance slot to selectively effect connection between said slot and either exit slot.

By a combination of positional relationships between the selector plate and the switch plate which carries it, the switch plate can be located in one position so as to shunt all carts into either one of the loops. Thus, the selection of the loop to receive all carts is a matter of manual positioning of the selector plate on the switch plate.

The invention is further featured by means for positioning the selector plate on the switch plate in such a manner that carts can be automatically alternated between the exit slots. Thus, by proper adjustment and securing of the plates, and an initial positioning such that a portion of the selector plate is in one exit slot, that slot is open to the first cart coming from the entrance slot. The cart tow pin strikes the selector plate in passing it and actuates it to push the switch plate into position to block that exit slot while opening the other one. Similarly, a second cart produces a precisely opposite effect while moving through the newly opened exit slot. Accordingly, a third cart will again reverse the effect and move into the first slot. Thus each exit slot receives every other cart and feeds them alternatively to the respective towline loops connecting downstream therewith.

In order to hold the switch plate in either of two positions for automatic cart switching, a resilient detent is provided of an over-center type, the movement of the carts providing force sufficient to overcome the detent force when the towpins strike the selector plate so as to snap the switch plate back and forth as the carts move therepast.

It will be understood that the towline systems and the carts with which the invention is utilized are of a conventional nature and accordingly no details of the structures thereof will be given herein except to the extent necessary to clarify the co-action of the invention therewith. Thus the carts themselves and the towpins are of known construction and are shown in the co-pending application wherein certain features relating to that invention have been added therein, and reference is made to the co-pending application for illustrating the carts preferably utilized in the present invention.

A detailed description of the invention now follows in conjunction with the appended drawings in which.

Figure 1:
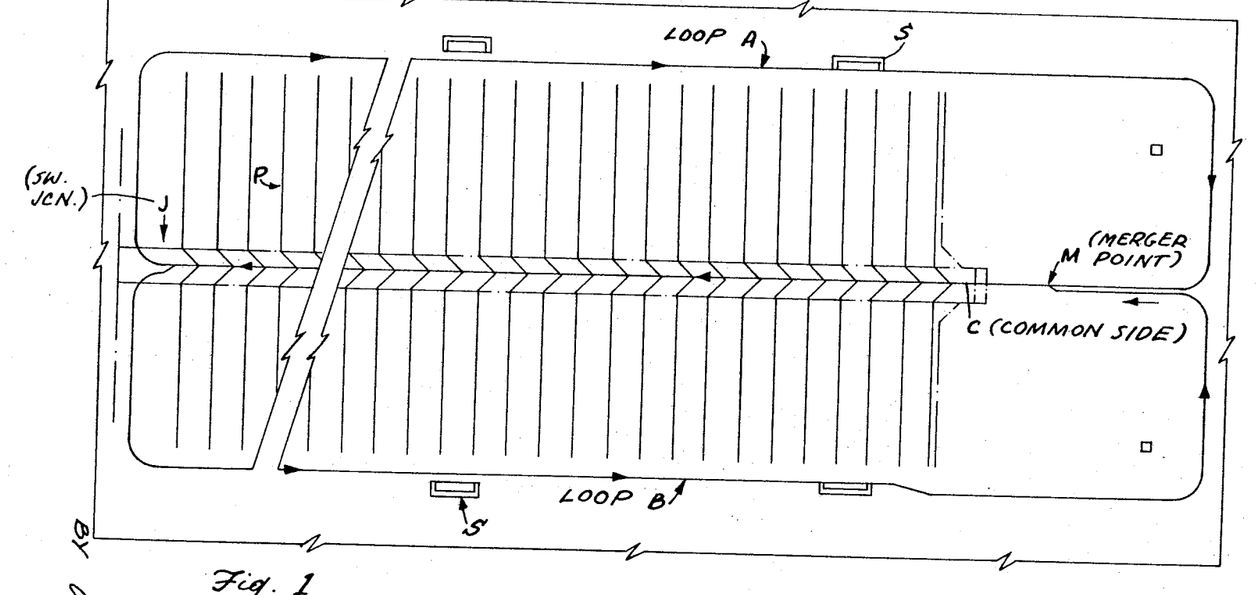
FIGURE 1 is an illustration in plan of a pair of tow lines comprising complete loops having a common side extending downstream from a merger point and directing carts to a switch junction.

Referring to FIG. 1, a schematic layout of a pair of towline Loops A and B is shown having chains moving in the arrow directions and having a common side C. It will be understood that the chain for Loop A is in a vertical plane with and above the chain for Loop B, there being a single floor slot at the common side, this being Slot A (FIG. 1a) with the Loop A chain (shown in phantom) accessible therebelow so that all carts from Loops A and B merging at the point M, illustrated in FIG. 1a, upstream of the common side are towed by the Loop A chain. At the downstream end of the common side, a switching junction J (FIG. 2) is provided as hereinafter described in detail. It will further be understood that all towpins are in the down position while going along the common side C of the loops. The towpins of carts which come from Loop A remain engaged with respective chain dogs while the towpins of carts from Loop B no longer engage chain dogs, such carts being pushed by carts from Chain A, as explained below.

Figure 2:
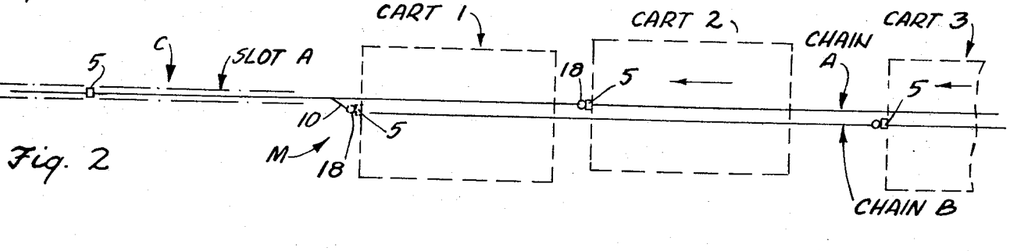
FIGURE 2 is a diagrammatic illustration in plan showing the relationship of the towline chains upstream of the merger point and the crossover symbolically shown between chains whereby carts are merged to a single chain to ge guided along the common side.

The towline chains are of conventional endless construction having dogs which are engageable with the towpins and move at the same speed. Referring to FIG. 2, the dogs 5 of Chain A are suitably staggered with respect to the dogs 5 of Chain B so that carts can merge without collision at point M to move down the common side C, Chains A and B being synchronized to maintain the proper spaced relationship.

A plurality of spur slots P leads from common slot C extending into the loop areas for storage and/or cart loading.

Figures 1A, 3A:
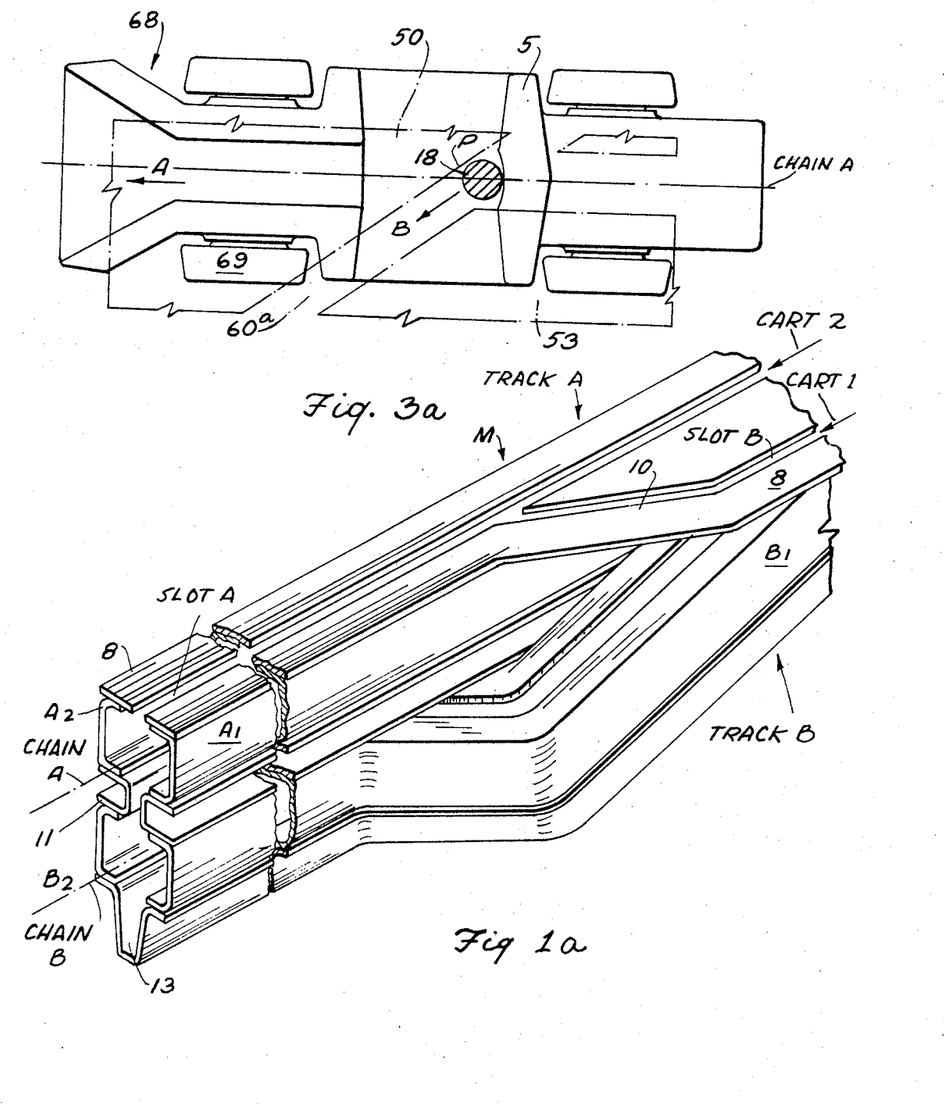
FIGURE 1a is a perspective illustrating the general arrangement of the towline tracks at the merger point.
FIGURE 3a is an enlarged detail of FIGURE 3 for illustrating the manner in which tow pins are released from the towing chain upon arriving at the switch junction.

FIG. 1a shows a perspective of the merging point M of FIG. 1, as to the essential parts, for the purpose of illustrating how Loop B merges below Loop A in order to form the common side C. Thus the metal floor strips 8 will be understood to be flush with the floor (not shown) and spaced to provide Slot A and Slot B. Any width or design of guide strips may be used, those shown on FIG. 1a being generalized, and it will be noted that floor Slot A continues beyond a crossover slot 10 so that, in effect, carts which move from Slot B to Slot A via the crossover slot are then propelled by being pushed by alternate carts of Chain A, as will be explained in conjunction with FIG. 2.

Tracks A and B are conventionally constructed (FIG. 1a) of identical channels $A_1$, $A_2$, $B_1$, $B_2$ as shown, and are parallel and in the same plane in their approach to the crossover slot 10. Some time before the crossover slot, Track B starts bending down and it will be understood that towpins in Slot B are thus disengaged from dogs (not shown) on Chain B. Track B also bends toward Track A and ultimately lines up with it in a vertical plane to form the common side C for the loops. The transition of Track B is a two dimensional curve and the particular illustration of FIG. 1a will be understood as not necessarily showing the exact degree of curvature; however, the actual curvature is a matter of design to suit various installations. The tracks are protected by suitable housings and casings below the floor, wherever it may be essential to prevent concrete from moving into the tracks and fouling the chains. Thus any suitable housings and protective casings may be used such as shown on FIG. 1a, protective closure elements 11 and 13 being suitably secured to the track flanges as by welding or the like.

FIG. 2 is a diagrammatic representation to approximate scale showing the relationship of the carts at the merging point M. The carts are shown in dash lines and Chain A and Chain B are depicted in solid lines. Chain A carries dogs 5 spaced roughly three times the length of a cart, as does Chain B. The dogs of Chain A are staggered with respect to those of Chain B. The crossover slot 10 is shown to indicate the merger of the tracks for Chain A and Chain B. At the entrance to the crossover slot a dog 5 on Chain B is shown in dotted lines to indicate that it has dropped below the point where it can engage the towpin 18 for Cart 1, which cart was propelled up to that point by Chain B. Thus Cart 1 has no power at this time; however, Cart 2, being driven via respective dog 5 on Chain A, moves in the direction of the arrow to engage the rear of Cart 1, thus pushing it across the crossover and into Slot A, a portion of which is shown by the phantom line. Slot A serves to guide the towpin 18 of Cart 1, but that towpin cannot engage a dog 5 on Chain A since it is intermediate such dogs, the upstream dog serving to propel Cart 2. Accordingly, Cart 2 propels Cart 1 all along the common side C of up to the switch junction J.

Cart 3 will be noted as approaching on Chain B in the direction of the respective arrow and will ultimately take its position at the entrance to the crossover 10 awaiting driving engagement by a subsequent cart (not shown) on Chain A.

The carts have front castered wheels (not shown) so that they may readily move over the crossover 10, and while there is slight angular movement of the carts in the course of such passage it does not amount to more than one or two degrees and may be neglected insofar as operation of the system is concerned.

A practical dimensioning for a system having this means of merging would have a distance of 5 inches center to center of the slots and approximately two and one-half cart lengths between pusher dogs on each chain. The crossover 10 has been found to be practical at an angle of 45° between floor slots.

Figure 3:
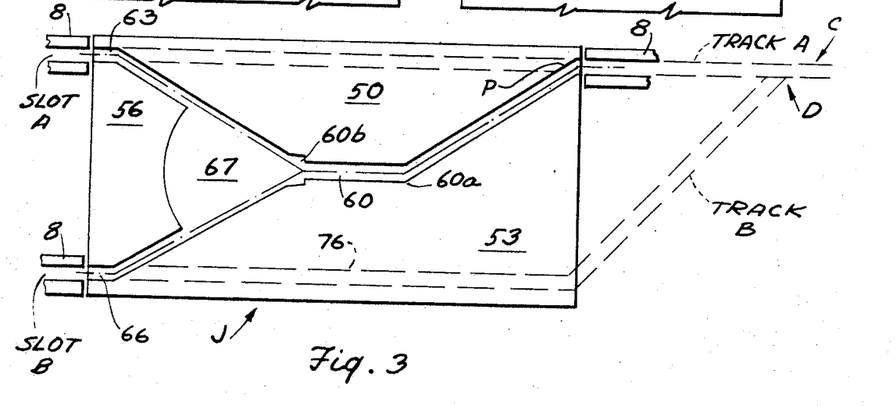
FIGURE 3 is a plan view of the relationship for metal floorplates which are spaced to provide guide slots across the switch junction.

The switch junction structure will now be described, reference being made initially to FIGS. 3 and 4. These figures show the general layout of the switch junction and with reference in particular to FIG. 3 will be seen to comprise metal floor plates 50, 53 and 56 which will be understood to be approximately flush with the floor and mounted for support on various channels and angles just below the floor, to be subsequently described. The floor plates are so designed as to provide space between opposing edges to effect various guide slots. Thus an entrance guide slot 60 is provided which connects with Slot A coming from the common side C. Such guide slot is effected by spacing of opposed edges of plates 50 and 53 and has an angular bend 60a in order to guide towpins and their respective carts to a widened throat or merger opening, 60b connecting with exit guide slots 63 and 66.

The exit guide slots connect with respective Slots A and B downstream of the switch junction. Plate 56 is arcuately cut out at 56a to provide a recess 67 for a switching mechanism to switch carts from Slot 60 to Slot 63 or 66.

At some point D (FIG. 3) upstream of the switch junction, Track B, as indicated by dashed lines, diverges away from its position below Track A and passes below plate 53. In thus passing below plate 53 Track B takes an upward slope (FIG. 8) and ultimately emerges below floor Slot B downstream of the junction, at which time Tracks A and B are once more on the same level and their chains can be engaged by towpins. Reference is also made to FIG. 1 showing emergence from junction J of the individual Loops A and B.

Track A passes below floor plate 50 but maintains a constant level ultimately emerging below floor Slot A downstream of the junction. The general constructional details from Tracks A and B below plate 53 will be subsequently described.

Chain A and Chain B remain, of course, in their respective tracks in passing below plates 50 and 53, respectively. No tow power is provided for carts in moving across the switch junction. A cart moving from the common side C into the entrance guide slot 60 can be switched into either of the exit slots 63 or 66 by a switch plate to be described, and power for each such cart is provided by being pushed from the rear by a following cart still powered by a dog on Chain A in a manner as the cross over movement described in connection with FIG. 2. Thus, the carts are considerably longer than the switch junction, the horizontal distance between the center of the entrance slot 60 and the center lines of Tracks A and B being approximately 6 inches and the total non-powered distance across the junction being about one foot. Accordingly, since the carts are some four and one-half feet long, the rear portion of any cart at the junction will be engaged by a following cart which will push it completely across the junction into position to be engaged by a dog on Chain A or Chain B downstream of the junction, depending upon which exit direction such cart takes.

As each cart approaches the junction its towpin engages the edge of plate 50 at some point P which pushes the towpin transversely out of line from Chain A, thus removing tow power from any cart engaging a dog on Chain A and rendering it subject to being pushed by a following cart.

This action is illustrated in FIG. 3a showing a dog carrier chain link 68 with dog 5, of conventional form, with rollers 69 which will be understood to ride on the lower flanges of respective track channels. A towpin 18 is normally pushed by dog 5 in the direction of movement shown by the arrow A. Towpin 18 is shown engaging point P at the edge of plate 40 (phantom) to be moved in a direction along that edge which forms entrance guide slot portion 60a, to thus disengage from dog 5, in the direction of arrow B as link 68 moves.

Figure 4:
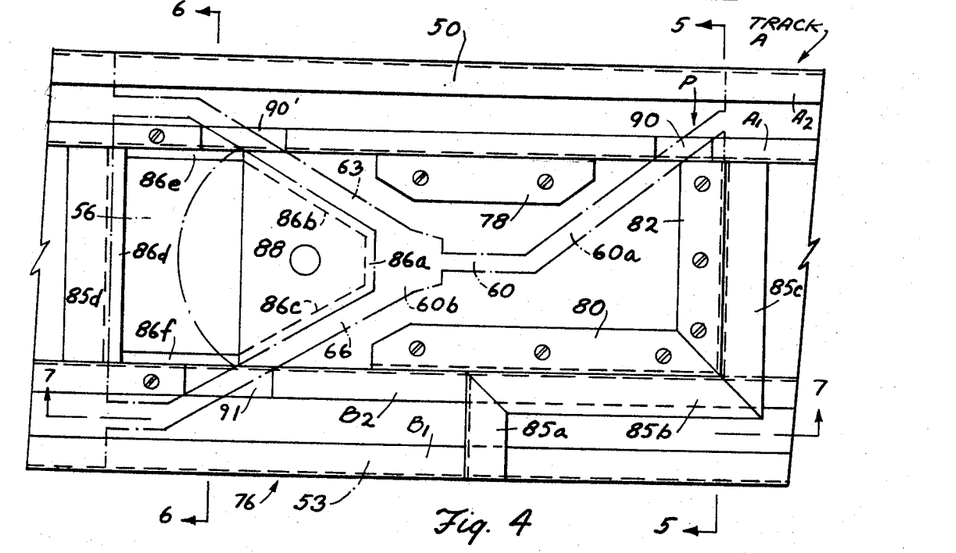
FIGURE 4 is a plan view showing various support members for the floor plates.

Referring to FIGURES 4 through 9 the structural and support details of the switch junction are illustrated. Thus, particularly referring to FIGURE 4, the support for the plates 50, 53 and 56 comprise, in addition to the upper flanges of channels $A_1$, $A_2$, $B_1$, and $B_2$, various angle members such as 78, 80 and 82, which are set slightly below the floor F as indicated by the concrete formation of FIGURE 9. The screw heads shown in the angle members will be understood to be for the purpose of fastening the plates thereto. The support structure is set in a hollow in the floor suitably sealed off as by housing or casing members 84a and 84b and a frame work of angle members designated as 85a, 85b, 85c may be set directly into the concrete so that the angles 78, 80, 82 may be welded directly thereto or otherwise fastened. Beyond the casing members 84a and 84b is a box-like structure made up of a bottom plate 86 (FIG. 9) having vertical plates extending upwardly therefrom such as 86a, 86b, 86c, 86d, 86E and 86f (FIG. 4). This effects a rigid welded structure to support a horizontal plate 88 in recess 67 on which plate is carried the actual switching mechanism to be hereinafter described. The plates 86d, 86e and 86f further strengthen the enclosure and also aid in support of floor plate 56.

Other structural details need not be shown and described since it will be understood that any suitable underfloor structure may be utilized for the particular purpose of supporting the switch mechanism and the construction illustrated is merely exemplary.

Figures 5, 6, 7, 9:
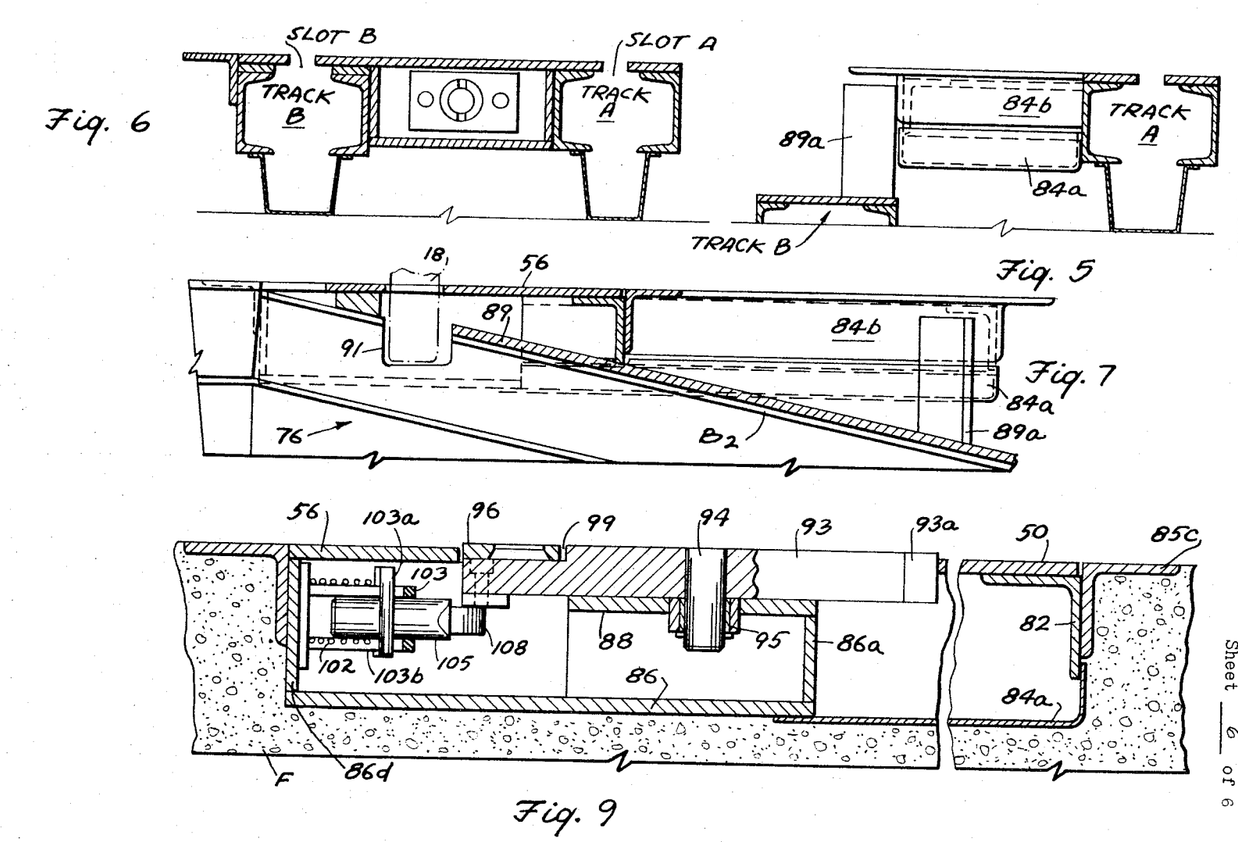
FIGURE 5 is a section through 5—5 of FIGURE 4.
FIGURE 6 is a section through 6—6 of FIGURE 4.
FIGURE 7 is a section through 7—7 of FIGURE 4.
FIGURE 9 is a section through 9—9 of FIGURE 8.

Referring particularly to FIGURES 5, 6 and 7, it will be noted that the Tracks A and B come in at different levels to the switch junction, as shown in FIGURE 5, and that Track B then slants upwardly at portion 76 so as to return to floor level as shown in FIGURE 6. The gap between the upper flanges of the channels is preferably closed by a cover plate 89 to keep dirt and grit away from the chain moving through Track B on the slope. A bracing angle 89a may be welded between casing 84a and plate 89.

Figure 8:
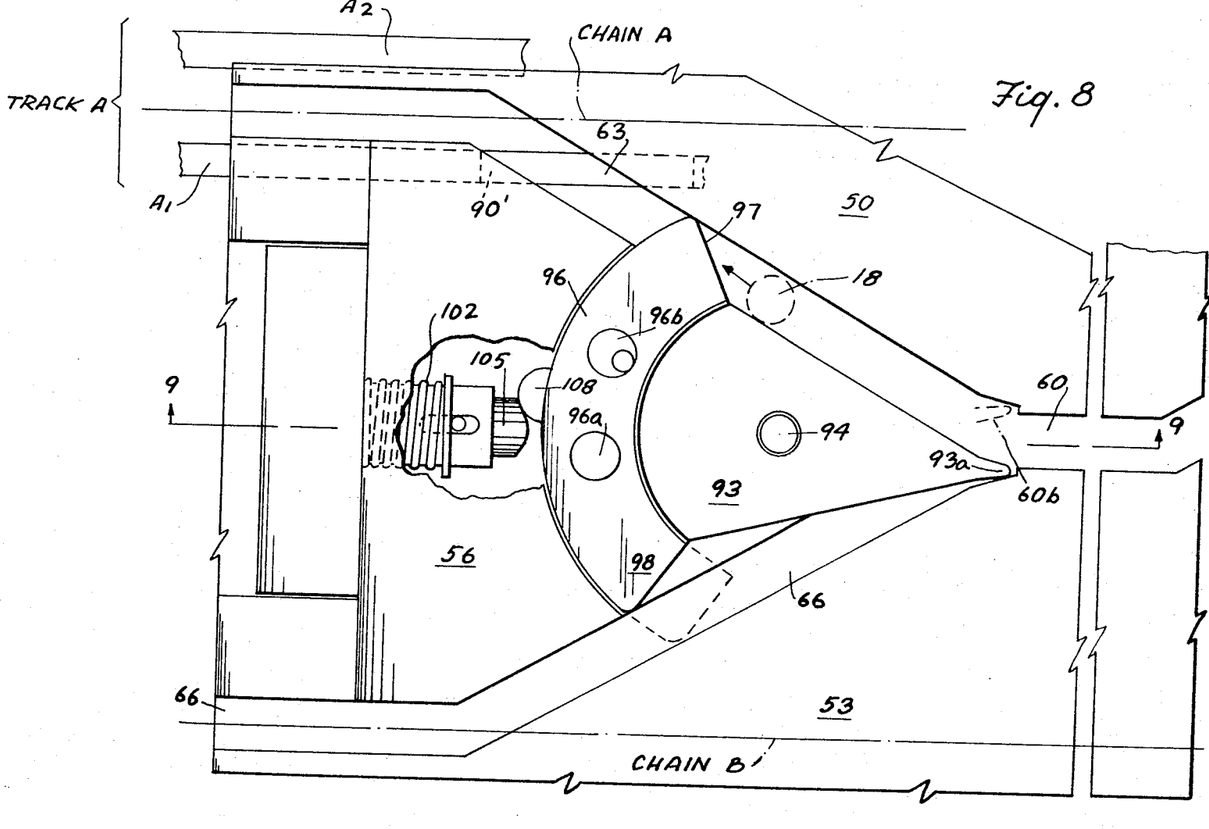
FIGURE 8 is a plan view showing essential components of the switch mechanism.

It will be noted that the inner channel $A_1$ (FIG. 4) which, in conjunction with the chanel $A_2$ (FIG. 1a), effects the construction for Track A is notched to a suitable depth at 90 so that towpins can pass through the channel's upper flange and side wall into the entrance slot portion 60a, progressing to slot 60 and thence to widened throat portion 60b (FIG. 8). Notch 90' provides for towpin movement from exit guide slot 63 to Track A. A notch 91 for the corresponding inner channel $B_2$ of Track B is shown on FIGS. 4 and 7.

Figure 10:
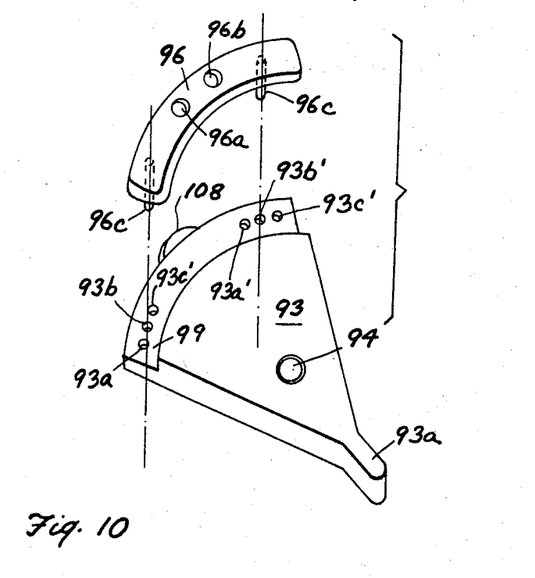
FIGURE 10 is a perspective exploded view showing details of the switch plate and selector plate which coacts with the switch plate for selectively directing carts across the switch junction.

Referring now to FIGS. 8, 9 and 10, a switch plate 93 is carried pivotally on plate 88. Switch plate 93 is mounted for pivotal movement by a pin 94 fixed thereto, the pin being rotative in a suitable bearing 95 in plate 88. The upstream end 93a of the switch plate forms an apex which can alternately engage the plate edges at the widened entrance throat 60b. Switch plate 93 carries an arcuate selector plate 96, and these plates are substantially flush with the metal floor plates, although they may be permitted to extend slightly thereabove as indicated in the cross-sectional view of FIG. 9. Arcuate plate 96 is carried in a correspondingly curved rabbet 99 at the edge of the switch plate and is manually removable so as to be set in different positions thereon. Thus, plate 96 can be lifted by finger holes 96a, 96b (FIG. 10) and has pins 96c spaced to selectively enter into hole pairs in the rabbetted edge of switch plate 93. Holes 93a and 93a', holes 93b and 93b', 93c and 93c', are spaced to equal the pin spacing. Accordingly, by lifting the plate 96 it may be positioned at three different places on the arc at the edge of the switch plate 93.

Plate 96 has approximately radial edges or shoulders 97 and 98, and by adjustment of the sector plate on the switch plate one such edge can extend into the respective exit slot 63 or 66. The switch plate 93 is held in position determined by selective setting of plate 96 against resilient detent means comprising the spring 102, reciprocal pin 105, and rounded pawl 108. Pin 105 is slidably guided in a slotted collar 103, by means of pin 103a sliding in slot 103b, collar 103 being secured to the plate 86d in any suitable manner as by welding.

The surface of the pin 105 and pawl 108 are rounded so that the pawl, which is carried fixedly by the switch plate, can snap back and forth in order to position either of the corners of the selector plate in a respective channel. Thus, in the relationship shown in FIG. 8, the pin 18 (shown dotted) moves to engage the edge 97 of the sector plate and pushes it in order to swing switch plate 93 counterclockwise on pivot pin 94. Accordingly, pin 18 would then pass completely through exit slot 63 and into Slot A to be engaged by a dog on Chain A downstream of the junction as its respective cart is pushed thereacross by a following cart. However, the edge 98 of the sector plate will have moved into exit slot 66 as shown by the dotted position and the switch plate motion has blocked exit slot 63 by virtue of causing movement of the apex 93a of the switch plate to the dotted position. Accordingly, movement of a subsequent towpin can only be into exit slot 66 and thus the respective cart would be shunted to Slot B. Such subsequent towpin would force the selector plate 96 back to the solid line position shown in FIG. 8 and accordingly exit slot 66 would then be blocked and the next cart would follow exit slot 63. Thus the mechanism automatically shunts alternate carts from common side C to each loop at the exit of the switch junction.

Figure 11:
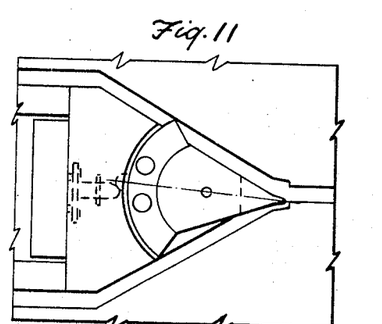
FIGURE 11 is a plan view generally similar to FIGURE 8 at a reduced scale, details being omitted, for comparison purposes with FIGURE 12, showing one setting of the switch plate for effecting alternating of carts automatically from one to the other of the towlines.
Figure 12:
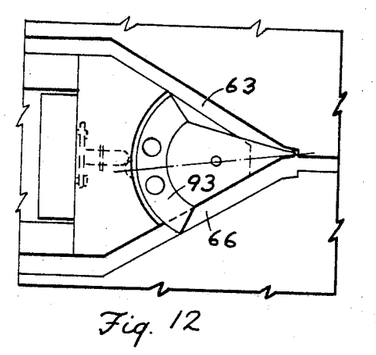
FIGURE 12 is a plan view showing an opposite setting of the switch plate as compared with FIGURE 11 wherein alternating of the carts is automatically effected commencing with the other of the towlines.

For the operation described above pin 96c (FIG. 10) were in holes 93b and 93b', the selector plate 96 being centered on the switch plate with edge 97 initially moved manually into exit slot 63. Thus, the alternating switching of the carts begins by sending the first cart to Loop A. For the purposes of convenient comparison with FIG. 12, FIG. 11 reproduces the initial condition of FIG. 8. However, as seen in FIG. 12, the initial position of the selector plate 96 is in exit slot 66, and the first cart would then go to Loop B.

Figure 13:
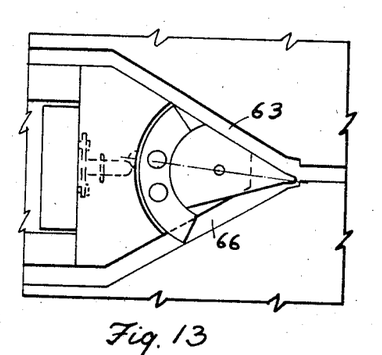
FIGURE 13 is a plan view showing a further setting of the switch plate for directing all carts to one towline.
Figure 14:
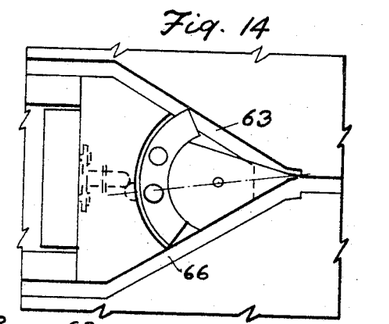
FIGURE 14 is a plan view showing a setting of the switch plate for directing all carts to the other towline.

If it be desired to send all carts to Loop A, then pins 96c are placed in holes 93a and 93a', thus blocking exit slot 66 (FIG. 13) and all carts move via exit slot 63. Similarly, by selection of holes 93c and 93c' exit slot 63 (FIG. 14) is blocked and exit slot 66 is open for movement of all carts to Loop B.

Switch plate 93 can be held in position by apex 93a engaging as a limit stop either of the edges of plates 50 and 53 at the widened throat 60b (FIG. 8) in conjunction with the resilient detent device. Switch plate stops can also be effected by engagement of the corners of the edges or shoulders 97, 98, of the selector plate 96 with the respective edges of the plates 50 and 53.

The resilient detent pin and pawl arrangement can, of course, be readily overpowered by the motivating force on carts crossing the switch junction, as effected by pull of Chain A, or by manual force for initial positioning of a sector plate shoulder in an exit guide slot.

The mode of synchronizing the tow lines so as to maintain the staggered spacing of the dogs is a matter of choice. For example, the tow lines may be driven by a common motor geared to chain drive sprockets of the respective tow lines, equal ratio gearing and equal size sprockets being used. Also, synchro motors, master and slave may be used.

While the carts are preferably of sufficient length relative to the length of the crossover 10 and switch junction so that a single cart will be pushed across either at any one time, it will be understood that this is not essential. Thus, two or more carts could be pushed in installations where short cart lengths are desired.

Having thus described my invention I am aware that changes may be made without departing from the spirit thereof, and therefore do not seek to be limited to the precise illustration herein given except as stated further in the appended claims.

I claim:

1. In a towline system having a pair of towlines, each of said towlines comprising a guide track and a respective tow chain, said guide tracks merging at an upstream end of a common side of said towlines wherein one guide track is disposed above the other and has a floor guide solt, a switch junction at a downstream end of said common side and having an entrance slot connected to said floor guide slot, the lower of said guide tracks being disposed to rise upwardly at said switch junction and having a floor guide slot extending downstream from said switch junction, the upper of said guide tracks remaining at substantially constant level and having a floor guide slot extending downstream from said switch junction, said switch junction having a pair of diverging exit slots connecting with said entrance guide slot and connecting with respective floor guide slots downstream of said switch junction, and switch means at said switch junction for diverting carts to either exit guide slot from said entrance slot.

2. In a switching device for switching carts between loops of a towline system having guide tracks and comprising means effecting a first guide slot in a floor for one guide track, and a second guide slot for the other guide track, means connecting said guide slots at a merger point with said guide tracks disposed in a vertical plane as upper and lower tracks and extending to a selectively operable switch means downstream of the merger point, said switch means having an upstream entrance slot connecting with said first guide slot, and having a pair of exit slots connecting with said entrance slot, a pair of floor guide slots downstream of said switch means connecting with respective exit slots for respective towline loops.

3. In a towline cart system having ap air of towlines and guide slot means at floor level for guiding towpins of carts, a switch junction comprising a switch plate connecting with upstream and downstream guide slot means, means for pivotally mounting said switch plate at substantially floor level, a selector plate carried by said switch plate, means for effecting selective securement of said selector plate in predetermined positions on said switch plate, a pair of guide slots in said switch junction on respective sides of said switch plate and connecting with said guide slot means, said switch plate having edges alternately positionable to form portions of respective guide slots operative to guide towpins therethrough from upstream to downstream guide slot means, said selector plate having shoulders movable into respective guide slots, commencing with an initially selected guide slot, said switch plate then effecting a path through said switch junction for carts following one of said guide slot means, said selector plate being engaged by a towpin passing through said selected guide slot to actuate said selector plate and to thus actuate said switch plate to effect a path through the other of said guide slots.

4. In a switch device as set forth in claim 3, and resilient detent means disposed to hold said switch plate in position to effect cart movement through either guide slot.

5. A switch device for a towline system, comprising a pivotal switch plate, an entrance guide slot for cart towpins disposed to guide carts toward said switch plate, an exit guide slot on either side of said switch plate merging into each other and into said entrance guide slot, said switch plate having sides which form portions of respective exit guide slots and having an end portion blocking one of said guide slots when said switch plate is in a predetermined position and blocking the other end of said guide slots when said switch plate is in an alternate position, whereby carts from said entrance guide slot are guided into one exit guide slot or the other dependent upon the position of said switch plate, and a member carried by said switch plate selectively positionable thereon, and means for securing said member in a selected position thereon to be engaged by carts in said exit slots for actuating said switch plate to alternate positions.

6. A cart switching device for a towline system having carts with towpins to be guided in floor slots, comprising a junction having a movable switch plate, said switch plate having a pair of angularly related sides joined at an apex, means providing an entrance guide slot leading to said apex, whereby movement of said switch plate permits either of the sides thereof to form a guide portion of a respective exit guide slot to effect passage of towpins to either exit guide slot dependent upon selective positioning of said switch plate, resilient detent means operatively connected to said switch plate for retaining said switch plate in a selected position; a selector member carried by said switch plate, means for selectively positioning said selector member on said switch plate, said selector member having shoulders positionable in respective exit guide slots dependent upon selective initial positioning of said switch plate, one such shoulder being engageable by a towpin moving through one exit slot when said switch plate is positioned to permit towpin passage through said exit slot, whereby said selector plate is actuated by said towpin to effect actuation of the switch plate so as to block said one exit guide slot and open the other exit guide slot, a shoulder of said selector plate being thus positioned in said other exit guide slot and engageable by a towpin passing therethrough, whereby said exit guide slots are alternately opened for passage of towpins.

7. A towline system for carts having towpins, said sysytem comprising a pair of towlines having a common side with a guide slot for towpins, each towline having a respective chain, the chain of one towline being accessible to towpins through said guide slot and being disposed above the chain of the other towline at said common side, a switch junction having an entrance slot downstream of said common side, said guide slot connecting with said entrance slot, said switch junction having exit slots and having means for switching carts from said entrance slot to one of said exit slots.

8. A towline system for carts having towpins, said sysytem comprising a pair of towlines having a common side with a guide slot for towpins, each towline having a respective chain, the chain of one towline being accesible to towpins through said guide slot and being disposed above the chain of the other towline at said common side, a switch junction having an entrance slot downstream of said common side, said guide slot connecting with said entrance slot, said switch junction having exit slots and having means for switching carts from said entrance slot to one of said exit slots, each of said chains having spaced dogs thereon, said chains being disposed to move to said common side from divergent directions and being synchronized so that the dogs of one chain are staggered with respect to the dogs of the other chain as said chains merge into said common side.

9. In a towline system as set forth in claim 8, means providing guide slots for each of said chains upstream of said common side, the guide slot for said common side being connected to the guide slot for the upper of said chains, a crossover guide slot whereby the guide slot for the lower of said chains is connected to the guide slot for the upper of said chains at a merger point, the lower of said chains being disposed to slant downwardly at said merger point and to thus release towpins adjacent said crossover slot from dogs on the lower of said chains, said chains approaching said merger point at substantially the same level with respect to a floor on which carts are moved by said chains, said guide slots for said chains being closely spaced at said merger point relative to the transverse width of said carts, whereby towpins in engagement with dogs on the upper of said chains move the carts thereof to engage the rear of carts associated with the lower of said chains and the towpins of which have been released at said merger point, to push said latter carts across said crossover guide slot and along said common side to said switch junction.

10. In a system as set forth in claim 9, each of said towlines comprising a respective upper and lower guide track for said chains, said guide tracks merging at an upstream end of said common side wherein one guide track is disposed below the other, said switch junction comprising spaced plates substantially at floor level, and effecting said entrance slot and said exit slots, said lower guide track passing below said plates and being slopingly disposed to rise upwardly thereunder, a guide slot substantially at floor level downstream of said switch junction and connecting with one of said exit slots and having a guide track connecting with said upwardly rising lower guide track, the upper guide track remaining at substantially constant level and passing below the level of said plates, and continuing downstream of said switch junction and having a guide slot connecting with one of said exit slots.

11. A switching device for a towline system having carts provided with towpins, comprising a plurality of plates spaced from each other so that the edges thereof effect an entrance slot and a pair of divergent exit slots connecting therewith; a towline guide track and respective tow chain extending below the level of said plates and extending downstream of said switch junction and comprising a guide track member having a notch therein below said entrance slot and disposed so that towpins moving into said entrance slot are engageable with an edge of one of said plates forming said entrance slot to be directed away from said guide track to be released from tow power of the chain thereof, a switching mechanism disposed at a junction of said entrance slot and said exit slots and being positionable to direct cart towpins from said entrance slot to either of said exit slots, said guide track member having a second notch below one of said exit slots whereby towpins may pass therefrom into said guide track for engagement by the chain thereof for movement downstream of said switch junction, the spacing between said exit guide slots transverse of direction of cart travel at said switch junction being less than cart width so that a cart approaching said switch junction under tow power is engageable with a cart at said switch junction to push said cart, said latter cart having been released from tow power.

12. A switch junction as set forth in claim 11, including a second towline track disposed below the level of said plates and extending downstream of said switch junction and having a notched member below the other of said exit slots whereby towpins may pass from said other exit slot into said second guide track.

13. A switch junction for a towline system comprising a plurality of plates spaced from each other so that the edges thereof effect an entrance slot and a pair of exit slots connecting with said entrance slot at a juncture, one of said plates having an arcuate edge facing said juncture to provide a sector-shaped recess, a switch plate within said recess and means mounting said switch plate for pivotal movement, said switch plate having angularly related sides wherein each side effects a guide wall for a respective exit slot dependent upon a selected position of said switch plate, a ring-shaped selector plate carried by said switch plate and having an arcuate edge conforming concentrically to the arcuate edge of said one plate so as to be rotatively movable with respect thereto and adjacent thereto about the pivotal axis of said switch plate, said selector plate having a lateral shoulder at each side thereof movable into a respective exit slot, and means whereby said selector plate may be carried on said switch plate in rotatively adjusted positions with respect to the pivotal axis thereof so that one or the other of said shoulders is positioned in a respective exit slot.

14. In a switch junction as set forth in claim 13, said latter means comprising a pair of pins carried by said selector plate and a plurality of pairs of holes carried by said switch plate, the spacing between said pins being the same as the spacing between the holes of each pair, said holes being arcuately spaced with respect to the pivotal axis of said switch plate, whereby said selector plate may be set in adjusted positions on said switch plate with said pair of pins in a selected pair of holes to thus effect positioning of the shoulders of said selector plate.

15. In a switch junction as set forth in claim 14, said shoulders of said selector plate being angularly related to each other and converging toward respective sides of said switch plate, said selector plate being symmetrically positionable on said switch plate by selection of one pair of said holes for entry of said spaced pins.

16. In a switch junction as set forth in claim 15, another pair of holes being disposed so that a shoulder of said selector plate clears one of said exit slots and the respective edge of said switch plate effects a portion of the passageway therethrough, a further pair of holes being disposed so that the other shoulder of said selector plate clears the other exit slot and the other edge of said switch plate effects a passageway therethrough.

17. In a switch junction as set forth in claim 13, said latter means comprising a pair of pins carried by said selector plate and a plurality of pairs of holes carried by said switch plate, the spacing between said pins being the same as the spacing between the holes of each pair, said holes being arcuately spaced with respect to the pivotal axis of said switch plate, whereby said selector plate may be set in adjusted positions on said switch plate with said pair of pins in a selected pair of holes to thus effect positioning of the shoulders of said selector plate, said switch plate having a rabbetted shelf of arcuate shape, said selector plate being supported thereon, said pairs of holes being in said rabbetted shelf, said selector plate having finger hole apertures for removal of said selector plate from said rabbetted shelf for re-positioning thereon.

18. In a towline system, a plurality of carts provided with respective towpins, guide slots through which said towpins protrude, moving chains for respective guide slots engageable by said towpins, a switch junction having an entrance slot connecting with a guide slot at the upstream side of said switch junction and having exit slots connecting with guide slots at the downstream side of said switch junction, means for effecting disengagement of towpins from the chain of the guide slot connecting with said entrance slot upon entry of towpins into said entrance slot, means at said switch junction for effecting selective switching of towpins from said entrance slot to an exit slot, and means for effecting pushing across said switch junction of carts having disengaged towpins by carts upstream thereof approaching said switch junction.

19. In a towline system as set forth in claim 18, said latter means comprising carts having a width relative to the direction of travel so that said approaching carts have front portions engageable with rear portions of carts having disengaged towpins to effect pushing thereof.

References Cited

UNITED STATES PATENTS

| | | | |
|---|---|---|---|
| 3,195,473 | 7/1965 | Dehne | 104—91 |
| 3,254,609 | 6/1966 | Losey | 104—172 |

ARTHUR L. LA POINT, *Primary Examiner.*

D. F. WORTH, *Assistant Examiner.*

U.S. Cl. X.R.

104—178